W. H. BUTZ & J. McCARTHY.
PORTABLE RAIL SAW.
APPLICATION FILED JAN. 30, 1913.

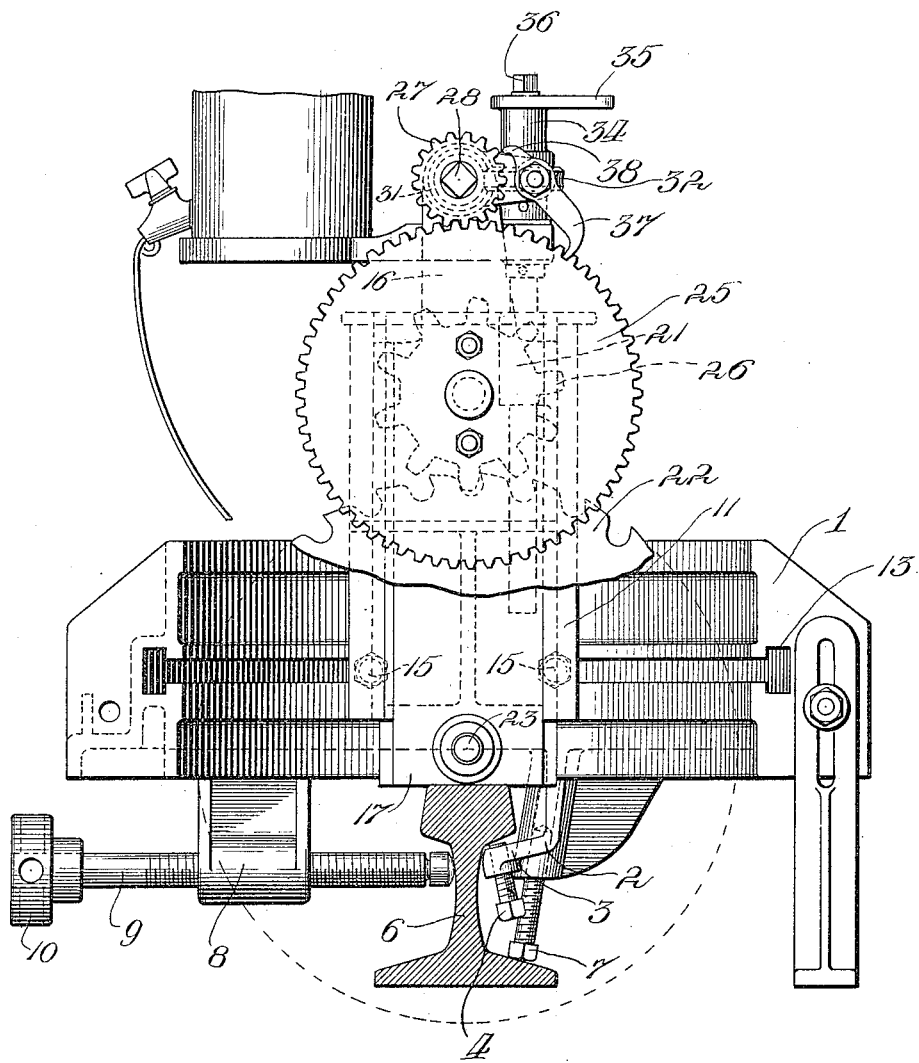

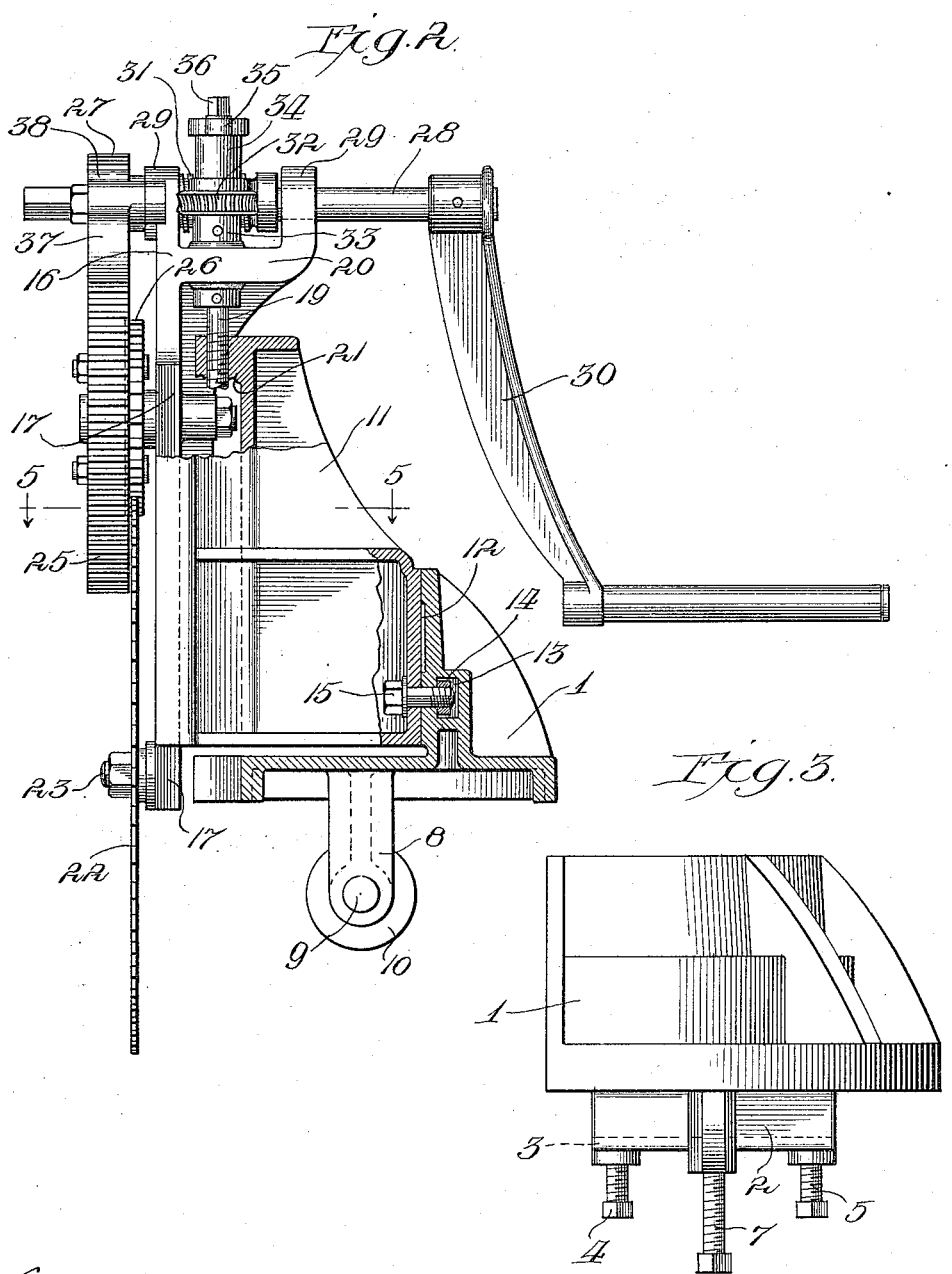

1,151,340.

Patented Aug. 24, 1915.
3 SHEETS—SHEET 3.

UNITED STATES PATENT OFFICE.

WALTER H. BUTZ AND JAMES McCARTHY, OF PLAINFIELD, NEW JERSEY, ASSIGNORS TO Q. & C. COMPANY, A CORPORATION OF MAINE.

PORTABLE RAIL-SAW.

1,151,340.

Specification of Letters Patent. Patented Aug. 24, 1915.

Application filed January 30, 1913. Serial No. 745,105.

*To all whom it may concern:*

Be it known that we, WALTER H. BUTZ and JAMES MCCARTHY, citizens of the United States, residing at Plainfield, county of Union, State of New Jersey, have invented a certain new and useful Improvement in Portable Rail-Saws, and declare the following to be a full, clear, and exact description of the same, such as will enable others skilled in the art to which it pertains to make and use the same, reference being had to the accompanying drawings, which form a part of this specification.

Our invention relates to a portable mechanism for sawing railway rails and the like and has for its object to simplify and improve the construction of the same.

A subsidiary object of our invention is to produce a simple and novel means for rigidly clamping the supporting frame of the sawing mechanism to a rail which is to be sawed.

A further subsidiary object of our invention is to produce a novel framework which will permit the saw to be adjusted accurately and conveniently at any desired angle.

Another subsidiary object of our invention is to provide a simple and effective expedient for preventing the saw from being turned backward, thus guarding against breaking the teeth.

Other subsidiary objects of our invention will be disclosed in the detailed description thereof.

Figure 4:
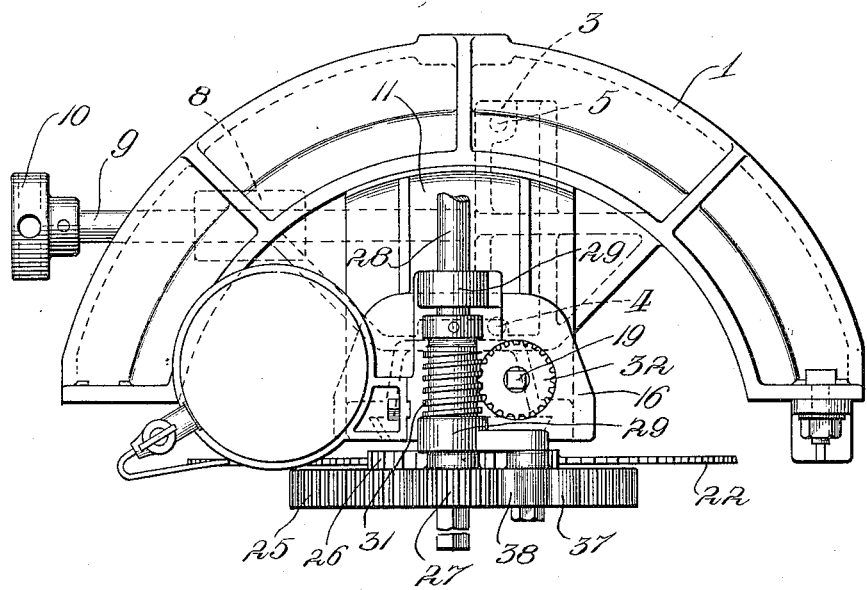
Figure 5:
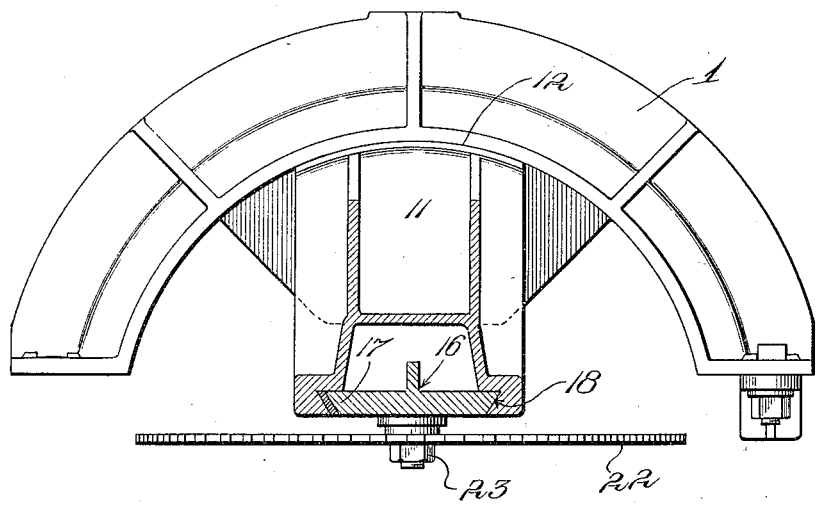

The various features of novelty whereby our invention is characterized will hereinafter be pointed out with particularity in the claims; but for a full understanding of the invention and of its various objects and advantages, reference may be had to the following detailed description taken in connection with the accompanying drawings wherein:

Figure 1 is a front elevation of a machine arranged in accordance with our invention, showing it applied to a rail to be sawed, a portion of the saw being broken away in order to expose parts concealed thereby; Fig. 2 is a view partly in side elevation and partly in section; Fig. 3 is a side elevation of the base of the machine; Fig. 4 is a plan view of the machine; and Fig. 5 is a section on line 5—5 of Fig. 2.

Referring to the drawing, 1 represents a heavy substantially semi-circular base member which is adapted to be clamped upon a rail with its axis at right angles to the longitudinal axis of the rail.

One of the features of our invention has to do with the clamping means which consists, generally speaking, of a plurality of adjustable distributed engaging parts arranged between the head and the base of the rail on one side, and preferably a single adjustable engaging member adapted to engage with the opposite side of the rail. In the particular arrangement shown, the member 1 is provided with a wide arm 2 adapted to lie beside the rail and having a part 3 projecting underneath the head of the rail. At the ends of the part 3 are two cap screws, 4 and 5, directed upwardly so as to engage with the under side of the head of the rail 6. A third cap screw, 7, is carried by the member 2 near the middle thereof in a position to engage with the upper side of the rail base when properly adjusted. On the opposite side of the rail is a downwardly-projecting post 8 carried by the member 1 and preferably lying opposite the screw 7 and between the screws 4 and 5. A heavy screw, 9, passes horizontally through the post 8 and is adapted to engage with the web of the rail on the side opposite to that on which the screws 4, 5 and 7 are located. The screw 9 is provided with a suitable head 10 by which it may be turned.

We prefer to make the parts 1, 2, 3 and 8 in the form of a single casting which, by being suitably cored out and reinforced, may be made to have great strength and rigidity without being unduly heavy.

It will be seen that when the base member, 1, is set upon a rail, and the screws 4, 5 and 7 adjusted until they engage with the head and the base of the rail, it will be immovably clamped upon the rail by setting up the screw 9; so that there can be no shifting or even vibration of the base during the subsequent sawing operation.

On the base is mounted a vertical main frame 11 whose rear face or side is curved, as indicated at 12, in order to fit the curvature of the inner vertical face of the base. The base and the frame are detachably connected together by means of suitable bolts. We prefer to provide the base with a T-slot 13 extending around the interior thereof and containing loose nuts 14 into which are screw-threaded the ends of bolts or screws 15 carried by the frame 11. There are preferably two of the screws or bolts, one located at each side of the main frame. By slightly loosening the screws or bolts the frame may be swung around within the base, the T-slot serving as a track or guide, thus permitting the front face of the frame to be brought at any desired angle with respect to the longitudinal axis of the rail. Then, by again tightening the screws or bolts 15, the frame is rigidly locked in its adjusted position. It will then be seen that the frame may be quickly adjusted and securely held in any desired angular position, thus permitting the rail, as will hereafter be explained, to be sawed at any desired angle.

On the main frame is mounted an auxiliary frame 16 adapted to be moved up and down as desired. The connection between the main frame and the auxiliary frame consists preferably of a vertical dovetailed groove 18 in the main frame into which fits a dovetailed part or tongue 17 carried by or forming part of the auxiliary frame. The adjustment of the auxiliary frame on the main frame is secured by means of a long vertical screw shaft 19 mounted in a bracket 20 at the top of the auxiliary frame so as to be revoluble therein but be held against axial movement relative thereto. The shaft passes down through and is screw-threaded in a boss or projection 21 on the main frame. It will thus be seen that by rotating the screw shaft, the auxiliary frame will be raised or lowered, depending upon the direction of rotation of the screw shaft. The auxiliary frame is adapted to carry the saw and the purpose of the screw shaft is therefore to feed the auxiliary frame down as the sawing progresses.

22 is a saw journaled, as at 23, on the lower end of the member 17 of the auxiliary frame, the parts being so arranged that the axis of the saw is horizontal, that is, at right angles to the direction of movement of the auxiliary frame relative to the main frame. The saw is of the type which serves also as a gear wheel, that is, it coöperates with a driving pinion which engages directly with the rear faces of the teeth to turn the saw. We have therefore journaled on the auxiliary frame just above the saw a gear wheel 25 carrying on its rear face a pinion 26 which meshes with the saw teeth. The gear wheel 25 is adapted to be driven by a pinion 27 meshing therewith and fixed upon a horizontal shaft 28 revolubly journaled in upwardly-projecting arms 29 forming part of the bracket 20 at the top of the auxiliary frame; the shaft 28 lying just at one side of the vertical screw shaft 19. The shaft 28 is provided at either or both of its ends with a crank handle or handles 30 by which it may be turned. It will thus be seen that by turning the crank handle or handles on the shaft 28 the latter is caused to rotate and, through the gear members 27, 25 and 26, rotate the saw.

Since the saw must be gradually lowered as the sawing operation progresses, we have provided an adjustable driving connection between the crank shaft 28 and the screw shaft 19. This connection consists of a worm 31 fixed upon the crank shaft and meshing with a worm wheel 32 frictionally held upon the screw shaft. The worm wheel lies between a collar 33 fixed upon the screw shaft and a nut 34 screw-threaded upon the screw shaft. By loosening the nut 34 the driving connection between the crank shaft and the screw shaft is interrupted and, by tightening the nut more or less, the worm wheel is frictionally held upon the screw shaft with more or less pressure, so as to cause the screw shaft to be rotated when the crank shaft is turned. The nut 34 is provided with a handle 35 by means of which it may quickly be loosened or tightened.

In order to raise the saw after a cut has been finished or when for any other reason it is desired to raise it, it should be lifted bodily and not by turning the crank or handles backward so as to raise the auxiliary frame by means of the screw shaft and simultaneously turn the saw backward; for a backward movement of the saw is almost certain to break some of the teeth. The saw can readily be lifted by loosening the nut 34 which controls the driving connection between the screw shaft and the crank shaft, and then turning the screw shaft by means of the wrench or handle plays upon the squared upper end 36 of the screw shaft. Notwithstanding this provision for raising the saw without turning the same, it is difficult to prevent workmen from lifting the saw in the wrong way if such a way be left open and we have therefore provided a positive means for preventing the raising of the saw by a backward rotation of the crank shaft. Specifically considered, this means comprises a double-ended pawl, one end, 37, of which engages with the teeth of the gear 25 while the other end, 38, is adapted to coöperate with the teeth on the pinion 27; the parts being so proportioned that when the pawl is lifted far enough to disengage it from the teeth of the gear 25 it is brought into operative locking relation with the gear 27, the pawl being in effect an escapement playing between the members 25 and 27 and permitting rotation in one direction only.

The operation of our improved saw will now be understood: when a rail is to be sawed, the machine is set upon the rail and the main frame is swung about so as to bring the saw at the proper angle relative to the longitudinal axis of the rail. The clamping devices are then tightened so as to fasten the machine securely to the rail. The friction nut on the screw shaft which raises and lowers the auxiliary frame is then tightened so as to obtain a driving connection between the crank shaft and the screw shaft. Upon turning the crank shaft by either or both handles, if two handles be provided, the saw is caused to turn and the auxiliary frame which carries the saw is caused to be fed slowly downward. During this operation, the double-ended pawl oscillates freely and does not interfere with the free angular movement of the gear wheels. When the saw is to be lifted, it is necessary to loosen the friction nut on the screw shaft, thereby disconnecting the screw shaft from the crank shaft, and then the screw shaft may be turned by a suitable wrench placed upon its squared upper end, thus lifting the auxiliary frame and the saw which it carries.

It will thus be seen that we have produced a simple, powerful machine having only a few parts; one in which absolute rigidity of support on the rail is obtained; one in which the saw may quickly be adjusted so as to bring it accurately into any desired angular position; and one in which there is no danger of breaking the saw through an attempt on the part of a careless workman to turn the saw backward for the purpose of raising the same.

While we have illustrated and described in detail only a single preferred embodiment of our invention, we do not desire to be limited to the exact structural details thus illustrated and described; but intend to cover all forms and arrangements, whether occurring in rail-sawing machines or other machines, which fall within the terms employed in the definitions of our invention constituting the appended claims.

We claim:

1. In a machine of the character described, a saw, a driving shaft, gearing including a gear wheel and a pinion for driving the saw, and a double ended pawl pivotally mounted between its ends in a position to bring one end in proximity to the teeth in the pinion and the other end in proximity to the teeth in the gear wheel, the ends of the pawl being shaped to permit rotation of the gearing in a direction to turn the saw forward and to lock the gearing against rotation in the opposite direction.

2. In a portable machine for operating on railway rails or the like, a frame member having on the under side means adjustable independently of and relatively to each other for engaging with the under side of the head of a rail and the top of the base of the rail at one side of the rail, and independently adjustable means on said member for engaging with the opposite side of the rail and pressing it laterally.

3. In a portable machine for operating on railway rails, a frame member, a part on the frame member for engaging with one side of a rail, and a plurality of distributed devices on said frame member for engaging with the under side of the head and the top of the base of the rail on the opposite side, said devices being adjustable independently of and relative to each other.

4. In a portable machine for operating on railway rails, a frame, a member depending from said frame adapted to lie at one side of a rail, a plurality of distributed screw-threaded devices carried by said member and adapted to engage with the under side of the head and the top of the base of the rail on the aforesaid side of the rail, and a screw-threaded member carried by said frame in position to engage with the opposite side of the rail.

5. In a portable machine for operating on railway rails, a frame, a member depending from said frame adapted to lie at one side of a rail, a plurality of distributed screw-threaded devices carried by said member and adapted to engage with the under side of the head and the top of the base of the rail on the aforesaid side of the rail, and a screw-threaded member carried by said frame in position to engage with the web of the rail on the opposite side of the rail.

6. In a portable machine for operating on railway rails, a stationary frame structure, means for clamping said structure to the rail, a movable frame mounted on the stationary structure, a shaft mounted on the movable frame so as to be revoluble therein and held against axial movement therein, a screw-threaded connection between said shaft and the stationary frame structure, a tool, a driving shaft, gearing between said driving shaft and said tool, a worm fixed upon said driving shaft, and a worm wheel upon the first mentioned shaft meshing with said worm.

In testimony whereof, we sign this specification in the presence of two witnesses.

WALTER H. BUTZ.
JAMES McCARTHY.

Witnesses:
  JEANNETTE C. BLATZ,
  F. J. BLATZ.